US012790262B2

(12) United States Patent
Shayestehaminzadeh et al.

(10) Patent No.: US 12,790,262 B2
(45) Date of Patent: Nov. 10, 2026

(54) GREENHOUSE GLAZING

(71) Applicant: AGC GLASS EUROPE, Louvain-la-Neuve (BE)

(72) Inventors: Seyedmohammad Shayestehaminzadeh, Gosselies (BE); Daphné Stassen, Saint-Servais (BE); Fabrice Dufour, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 282 days.

(21) Appl. No.: 18/683,449

(22) PCT Filed: Aug. 30, 2022

(86) PCT No.: PCT/EP2022/074016
§ 371 (c)(1),
(2) Date: Feb. 13, 2024

(87) PCT Pub. No.: WO2023/031152
PCT Pub. Date: Mar. 9, 2023

(65) Prior Publication Data

US 2024/0351942 A1 Oct. 24, 2024

(30) Foreign Application Priority Data

Aug. 31, 2021 (EP) .................................... 21194145

(51) Int. Cl.
*C03C 17/34* (2006.01)
*A01G 9/14* (2006.01)

(52) U.S. Cl.
CPC ........ *C03C 17/3417* (2013.01); *A01G 9/1438* (2013.01); *A01G 2009/1484* (2013.01);
(Continued)

(58) Field of Classification Search
None
See application file for complete search history.

(56) References Cited

U.S. PATENT DOCUMENTS

2013/0163087 A1 6/2013 Lecolley et al.
2020/0131082 A1 4/2020 Lequippe et al.
(Continued)

FOREIGN PATENT DOCUMENTS

EP 2726286 B1 * 9/2019 ............. C03C 15/00
WO WO 2012/028626 A2 3/2012
(Continued)

OTHER PUBLICATIONS

Translation of Cohin et al., WO 2021/15667 (Year: 2021).*
(Continued)

*Primary Examiner* — David Sample
(74) *Attorney, Agent, or Firm* — Oblon, McClelland, Maier & Neustadt, L.L.P.

(57) ABSTRACT

A greenhouse glazing, including a glass substrate with a first surface containing a first coating and a second surface containing a second coating. The first surface is an air-side face of the glass substrate and the second surface is a tin-side face of the glass substrate, and the second surface is textured prior to a deposition of the second coating in such a way that a roughness parameter Rsm is at most 155 μm. The first coating on the first surface contains a nano-porous silica layer having a thickness between 80 and 150 nm and a transparent conductive oxide located between the nano-porous silica layer and the first surface of the glass substrate. The second coating on the second surface contains a nano-porous silica layer having a thickness between 80 and 180 nm.

21 Claims, 2 Drawing Sheets

(52) U.S. Cl.
CPC .. *C03C 2217/212* (2013.01); *C03C 2217/213* (2013.01); *C03C 2217/94* (2013.01); *C03C 2218/31* (2013.01)

(56) References Cited

U.S. PATENT DOCUMENTS

| | | | | |
|---|---|---|---|---|
| 2020/0277214 | A1* | 9/2020 | Courtemanche | G02B 5/0215 |
| 2023/0271876 | A1* | 8/2023 | Shayesteh | C03C 17/245<br>65/60.5 |

FOREIGN PATENT DOCUMENTS

| | | | |
|---|---|---|---|
| WO | WO 2017/119279 | A1 | 7/2017 |
| WO | WO 2019/008282 | A2 | 1/2019 |
| WO | WO 2021/156567 | A1 | 8/2021 |

OTHER PUBLICATIONS

International Search Report Issued Nov. 30, 2022, in PCT/EP2022/074016, filed on Aug. 30, 2022, 3 pages.

International Preliminary Report on Patentability (Chapter 1 of the Patent Cooperation Treaty) and PCT Written Opinion of the International Searching Authority Issued in International Application No. PCT/EP2022/074016 on Mar. 5, 2024.

* cited by examiner

GREENHOUSE GLAZING

CROSS REFERENCE TO RELATED APPLICATIONS

This application is a National Stage entry under 35 U.S.C. § 371 of PCT/EP2022/074016, filed on Aug. 30, 2022, and claims priority to EP patent application Ser. No. 21/194,145.5, filed on Aug. 31, 2021, the entire contents of both are incorporated herein by reference.

TECHNICAL FIELD

The present invention relates to glazing for greenhouses which are designed to fit cold climate. Namely the glazing of the invention are characterized through a low thermal emissivity for a better thermal isolation, keeping a high PAR transmittance and a high hemispherical transmittance. Moreover a particular adjusted hortiscatter may be added to the glazing unit by creation of surface roughening.

BACKGROUND ART

For an optimal plant growth, the greenhouse environment requires maximum amount of light well distributed all over the greenhouse volume, along with a specific homogeneous temperature range as well as enough carbon dioxide and humidity. More particularly, the PAR light, corresponding to a wavelength between 400 and 700 nm (based on NEN 2675+C1:2018), is the light responsible for crop growth and specific attention has to be taken into account to keep the amount of this part of light as much and as homogeneously as possible distributed inside the greenhouse. This means that the glazing covering the greenhouse should have minimum amount of absorption or reflection over the PAR region.

While speaking about greenhouses, depending the geographical location and the time in the course of the day, the light is coming from different directions with different intensity. As a consequence, the light transmission inside the greenhouse is better defined by the hemispherical transmission which integrates light coming from different angles.

In cold climate, the inside temperature of the greenhouse may decrease dramatically because of thermal energy losses through the glass due to the poor thermal insulation i.e. high emissivity of normal soda lime glass. Besides the direct temperature reduction due to the energy loss through greenhouse glass, temperature decrease can also lead to an additional problem that is the condensation of water on the structural surfaces and leaves which can increase the overall water consumption of the greenhouse and the chance of propagation of diseases such as mildew, respectively. To help solving this complex issue, the prior art has proposed greenhouse glazing made with a low emissive glass which is for example, a glass coated with a transparent conductive oxide. Such a coating helps in reflecting back the far infrared thermal radiation inside the greenhouse resulting in more heat preservation which consequently causes the glass to be warmer reducing the chance of condensation. Nevertheless it has the disadvantage that the PAR light transmittance is decreased because of its reflection on the conductive oxide.

The European Patent Application EP2340706A1 discloses that by adding an antireflective stack made of 4 layers above the transparent conductive oxide layer, it was possible to increase somewhat the light transmission in the visible range and more particularly in the PAR range. EP2340706A1 discloses a complex and expensive multilayer system but gives neither information on hemispherical light transmission nor hortiscatter.

Despite this solution is a promising one, the greenhouse glazing still may be improved. This is the purpose of this invention which provides a low-emissivity glazing characterized by a high PAR transmittance, a high hemispherical transmittance and an adjustable hortiscatter. We also emphasize that the glazing of the invention is characterized by a good hydrophilicity and durability.

Such improvements are possible by combining different characteristics that may be imparted to a glass. Namely, the glass of our invention is a clear or preferably an extra-clear glass that allows a good light transmittance. One side of the clear or extra-clear glass can be textured in such a way that the glazing present an optimised roughness to allow a good light diffusion. Both sides of the glazing are coated with a nano-porous silica layer. It has surprisingly been found that such a layer is sufficient to improve the performances of the greenhouse glazing of the invention without having complicated and expensive stack of different layers. Another advantage of using our specific nano-porous silica layer is a better protection against glass corrosion which makes the glazing of the invention more durable.

A low-e stack is added on at least one side of the glazing (on the non-textured side) between the glass surface and the nano-porous silica layer. The emissivity drops below 0.20 while the PAR transmittance remains high.

Thanks to the combined characteristics mentioned above, the glazing of the invention shows very good performances in terms of PAR transmittance, hortiscatter and thermal isolation. Another advantage of the glazing of the invention is that thanks to the combined parameters, we observe a good hydrophilicity on the textured side of the glass where condensation of water occurs as a film instead of droplets. When etching is included, we can even improve the hemispherical light transmission in wet condition as compared to its value in dry condition that represent an important part of the time in cold countries and is thus a realistic measure. Additionally, this hydrophilic property of the glass causes the water to stay on glass and to be recycled via gutters for re-usage. This property can avoid also the dripping which is not preferred due to the its damage on flowers and crops on the early stages of growth.

The hortiscatter is easily adjusted by modifying the morphology of the textured surface. This parameter is very important for the light scattering and is here characterized by its roughness, more particularly by the Sa, Sz and Rsm parameters.

OBJECT OF THE INVENTION

The objective of the invention is to have a glazing to be used in greenhouses designed for cold climate. The glazing must be characterized by a low emissivity with limited loss on its hemispherical light transmittance and more particularly on its PAR transmittance. The object of this invention is to have a normal emissivity smaller than 0.20, preferably smaller than 0.16, and more preferably smaller than 0.13. In a particular aspect of the invention, the hortiscatter may vary from 0 to 70%. The hortiscatter of the glazing of the invention may be easily adjusted by tuning the roughness of the tin side of the glass substrate. Depending the existence or not of a hortiscatter the hemispherical light transmission will be in different ranges. Practically, if hortiscatter is 0%, the hemispherical light transmittance is at least 82%, preferably at least 84% and more preferably at least 86%. If the hortiscatter is greater than 0%, the hemispherical light transmittance is comprised between 71.5% and 85%, preferably between 73% and 83.5% and more preferably between 74.5% and 82%.

For both cases, with or without existing hortiscatter, the PAR transmittance of at least 90.5%, preferably at least 91% and more preferably at least 91.5%. As other advantages, the glazing of the invention present a good hydrophilicity on the textured side and a good durability.

SUMMARY OF INVENTION

This invention scope concerns a greenhouse glazing comprising a glass substrate with a first surface comprising a first coating and a second surface comprising a second coating wherein,

- the first coating on the first surface comprises a nano-porous silica layer having a thickness comprised between 80 and 150 nm, preferably between 100 and 120 nm and a transparent conductive oxide being located between the nano-porous silica layer and the first surface of the glass substrate,
- the second coating on the second surface comprises a nano-porous silica layer having a thickness comprised between 80 and 180 nm, preferably between 100 and 120 nm.

According to one particular embodiment, the greenhouse glazing of the invention comprises a first dielectric layer on the first glass substrate below the transparent conductive oxide. In a preferred embodiment the first dielectric layer is a titanium oxide layer and has a thickness between 5 and 25 nm, preferably between 8 and 15 nm.

According to one particular embodiment, the greenhouse glazing of the invention has a first and a second dielectric coating layers deposited between the first glass surface and the transparent conductive oxide. In a preferred embodiment the first dielectric layer is deposited directly on the glass substrate and is a titanium oxide layer having a thickness comprised between 5 and 25 nm, preferably between 8 and 15 nm and a second dielectric layer is deposited over the first dielectric layer, preferably the second dielectric layer is a silicon oxide layer having a thickness comprised between 10 and 40 nm, preferably between 20 and 30 nm. It is clear for the man of the art that both dielectric layers deposited below the transparent conductive oxide layer may contain impurities or other elements in a total ratio that is smaller than 10 weight %.

According to one particular embodiment the transparent conductive oxide of the invention is a doped tin oxide, the doping element is chosen between fluorine and antimony. More particularly, the transparent conductive oxide has a thickness comprised between 150 and 500 nm, preferably between 170 and 360 nm and more preferably between 300 and 340 nm.

According to one particular embodiment of the invention, the second surface of the glazing of the invention is textured prior to the deposition of the second coating. The textured surface has a roughness characterized by the Sa parameter comprised between 0.05 and 10 μm, the Sz parameter comprised between 1 and 12 μm and the Rsm parameter comprised between 50 and 155 μm.

According to one particular embodiment of the invention, when the second surface of the glazing of the invention is textured, the roughness of the textured surface is characterized by the parameter Sa being at least 0.05 μm, preferably at least 0.10 μm, more preferably at least 0.20 μm and being at most 10 μm, preferably at most 5 μm, more preferably at most 2 μm.

According to one particular embodiment of the invention, when the second surface of the glazing of the invention is textured, the roughness of the textured surface is characterized by the parameter Sz being at least 1 μm, preferably at least 2 μm, more preferably at least 3 μm and being at most 12 μm, preferably at most 10 μm, more preferably at most 9 μm.

According to one particular embodiment of the invention, when the second surface of the glazing of the invention is textured, the roughness of the textured surface is characterized by the parameter Rsm being at least 50 μm, preferably at least 55 μm, more preferably at least 60 μm and being at most 155 μm, preferably at most 140 μm, more preferably at most 130 μm.

According to a preferred embodiment, both nano-porous silica layer on each side of the greenhouse glazing of the invention have a refractive index of at most 1.5, preferably at most 1.4 and more preferably at most 1.38. The refractive index of one nano-porous silica layer may be different of the refractive index of the other nano porous silica layer of the greenhouse glazing.

According to a preferred embodiment, the transparent conductive oxide of the invention is deposited through an online CVD process on the air side of the glass ribbon during the glass manufacturing process. This CVD deposition process is well known and better described in EP1877350B1, incorporated here by reference. Also according to one particular embodiment of the invention first and second dielectric between the glass surface and the transparent conductive oxide are deposited also by CVD on the glass ribbon before the deposition of the transparent conductive oxide, as described in EP1877350B1.

According to a particular embodiment of the invention the tin side of the glass substrate can be textured in a following step. Any known method such as mechanical or chemical process may be convenient as far as the correct roughness is reached. The correct roughness is advantageously described through specific parameters in the table 1.

TABLE 1 roughness characterization

| | preferred | More preferred | Most preferred |
|---|---|---|---|
| Roughness Sa (μm) | 0.05-10 | 0.1-5 | 0.2-2 |
| Roughness Sz (μm) | 1-12 | 2-10 | 3-9 |
| Roughness Rsm (μm) | 50-155 | 55-140 | 60-130 |

For example, texturing may be obtained by means of a controlled chemical attack with an aqueous solution based on hydrofluoric acid, carried out one or more times. Generally, the aqueous acidic solutions used for this purpose have a pH between 0 and 5 and they can comprise, in addition to the hydrofluoric acid itself, salts of this acid, other acids, such as HCl, $H_2SO_4$, $HNO_3$, acetic acid, phosphoric acid and/or their salts (for example, $Na_2SO_4$, $K_2SO_4$, $(NH_4)_2SO_4$, $BaSO_4$, and the like), and also other adjuvants in minor proportions. Alkali metal and ammonium salts are generally preferred, such as, for example, sodium, potassium and ammonium bifluoride. The acid etching stage according to the invention can advantageously be carried out by a controlled acid attack, for a time which can vary as a function of the acid solution used and of the expected etched surface result.

According to any of the previous embodiment, a nano-porous silica layer is deposited on both sides of the glass substrate.

According to a particular aspect of the invention the nano-porous silica layer deposition is performed through a PECVD process as described in EP1679291B1 and incorporated here by reference. The nano-porous $SiO_x$ film will get its final optical and mechanical properties in a two-step production. At first, in the as-deposited state the thin film is coated by a PECVD process and results in high carbon content $SiO_xC$, coating, the layer comprises 5 to 30 at. % of Silicon, 20 to 60 at. % of Oxygen, 2 to 30 at. % of carbon and 2 to 30 at. % of hydrogen. In order to get the final optical and mechanical properties one needs to bake the glass and the film. The carbon is desorbed during the tempering process leaving increased porosity, pores having a mean diameter greater than 5 nm. Increasing porosity results in a smaller refractive index, responsible for the antireflective performance. Preferably, after tempering, the refractive index of the $SiO_x$ layer is at most 1.5, preferably at most 1.4 and more preferably at most 1.38. Temperatures for any heat strengthened glass are between 650° C.-680° C. Advantageously, the final refractive index is 1.37.

The inventors have discovered that by adding such nano-porous silica layer on both side of the glass, both hemispherical light transmittance ($T_{hem}$) and PAR transmittance ($T_{PAR}$) increase of at least 8% preferably 10%.

As another advantage, the inventors have discovered that the textured side of the glazing of the invention has an enhanced hydrophilicity, characterized by a water contact angle that is quite low. This property is a result of combining textured surface with nano-porous silica layer, allowing water condensed on the inner glass inside the greenhouse to be formed as a film instead of drops and as a result, elevating the hemispherical light transmission in wet condition. Thanks to this hydrophilic property, the so called rain effect inside the greenhouse may be avoided.

Hortiscatter may be adjusted from 0 to 70% depending the particular need and this can be easily done by adjusting the surface texture on at least one side of the glass. This will also has an incidence on the glazing characteristics. Here below, we summarized in 2 tables the targeted properties depending if the glazing surface has been textured or not.

TABLE 2

Main characteristics of the glazing of the invention without hortiscatter

| | Preferred | More preferred | Most preferred |
|---|---|---|---|
| Normal emissivity | <0.20 | <0.16 | <0.13 |
| Hemispherical light transmission (%) | >82 | >84 | >86 |
| PAR transmission (%) | >90.5 | >91 | >91.5 |

TABLE 3

Main characteristics of the glazing of the invention with hortiscatter.

| | Preferred | More preferred | Most preferred |
|---|---|---|---|
| Normal emissivity (%) | <0.20 | <0.16 | <0.13 |
| Hortiscatter level (%) | >0-80 | 5-75 | 10-70 |
| Hemispherical light transmission (%) | 71.5-85 | 73-83.5 | 74.5-82 |
| PAR transmission (%) | >90.5 | >91 | >91.5 |
| Water contact angle (°) | <32° | <30° | <28° |

The glazing of the invention is a class A certified coated glazing, the certification is conform to the norm EN1096-2 2012E.

BRIEF DESCRIPTION OF DRAWINGS

This and other aspects of the present invention will now be described in more detail, with reference to the appended drawings and by showing various exemplifying embodiments of the invention.

FIG. 1 shows 2 preferred embodiments of the invention.

DESCRIPTION

Figure 1A:
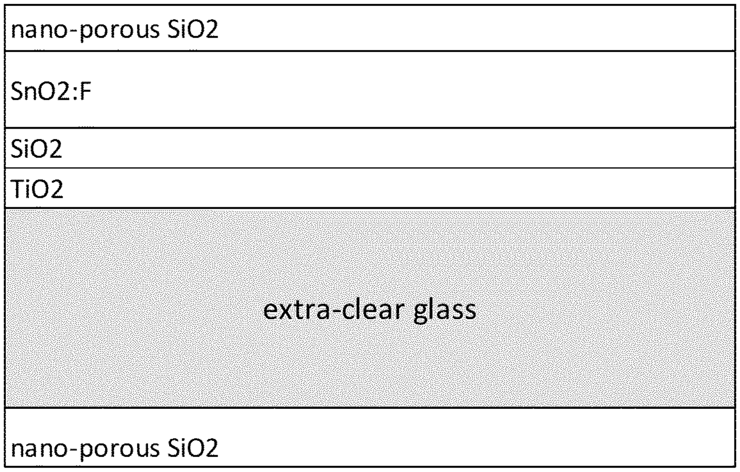
FIG. 1*a* illustrates a glazing of the invention without hortiscatter and FIG. 1*b* illustrates a glazing of the invention with hortiscatter
Figure 1B:
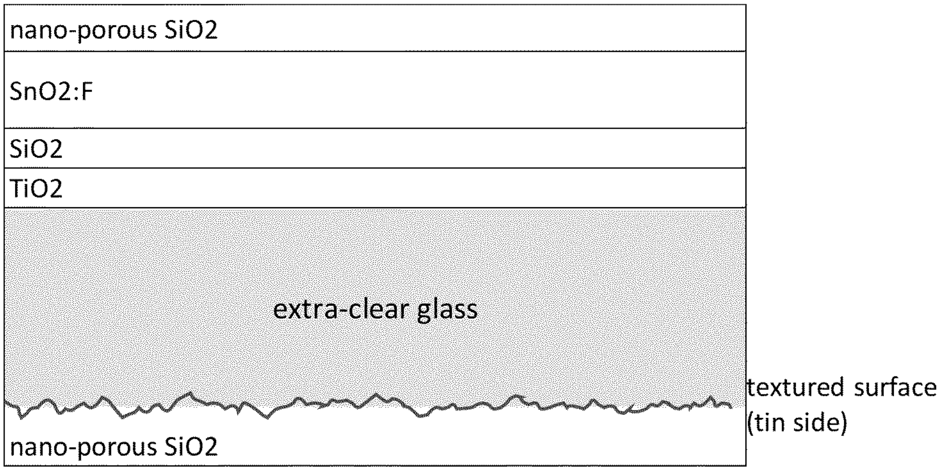
Figure 2A:
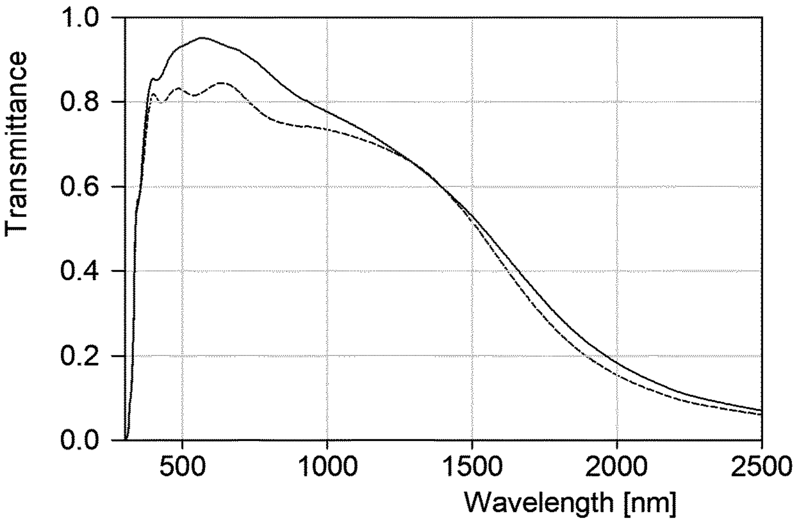
FIG. 2 shows the impact of the antireflective coating on transmittance (FIG. 2*a*) and reflectance (FIG. 2*b*). In both graphs, the solid line correspond to the greenhouse glazing of the invention (with antireflective coating on each side) and the dashed line correspond to the same glazing without antireflective coating.
Figure 2B:
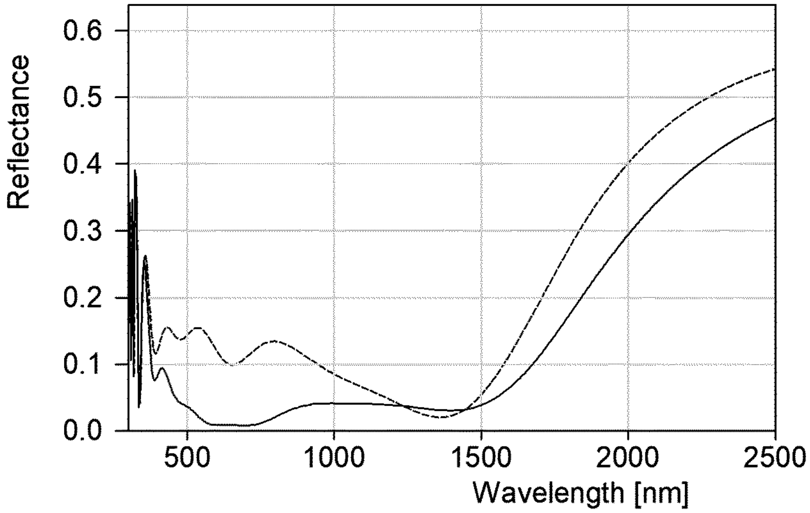
Figure 3:
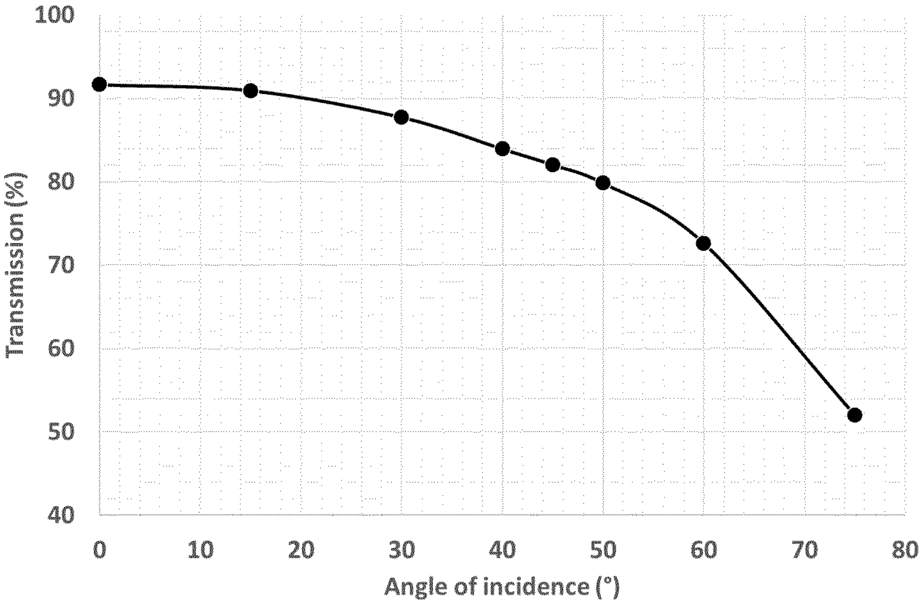
FIG. 3 shows the angular transmission of the textured glass with 2 antireflective coating and a hortiscatter of 30%.

The features of our invention are the consequence of a combination of glass quality, glass surface treatment (or not depending the desired hortiscatter) and both low-e and antireflective coatings. Each of those characteristics will now be described with more details.

Definitions

When a specific range is given for a particular characteristic, we consider the limits of this range is part of it.

PAR meaning is Photosynthetically active radiation and comprises wavelength between 400 to 700 nm, based on NEN 2675+C1:2018. This is the main part of natural light responsible for photosynthetic activities of plants.

Within the context of horticulture, Hortiscatter is the integral value of geometrical distribution of light intensity by bi-directional transmittance (or reflectance) distribution function BTDF under a given angle of incidence of incoming light beam (3D data), defined by Wageningen University and Research (WUR) in the standard NEN 2675+C1:2018.

Hemispherical light transmission ($T_{hem}$) is measured following the standard NEN 2675+C1:2018. The hemispherical light transmission is a measure of light transmission at different angles from the point of light incidence.

The refractive index n is calculated from the light spectrum wavelength at 550 nm.

When roughness is considered, the latter is characterized through the Sa, Sz and Rsm values (expressed in micrometers). The roughness parameters were measured by confocal microscopy. The surface parameters (Sa and Sz) according to ISO 25178 standard (part 2 and part 3, 2012F), and the profile parameter (Rsm) by isolating a 2D profile which then gives access to the parameters defined in the ISO 4287-1997 standard. Alternatively, one can use a 3D profilometer for the surface parameters (according to the ISO 25178 standard, part 2 and part 3, 2012F) and a 2D profilometer for the profile parameters (according to the ISO 4287-1997 standard). The texture/roughness is a consequence of the existence of surface irregularities/patterns. These irregularities consist of bumps called "peaks" and cavities called "valleys". On a section perpendicular to the etched surface, the peaks and valleys are distributed on either side of a "center line" (algebraic average) also called "mean line". In a profile and for a measurement along a fixed length (called "evaluation length").

Sa (arithmetic mean height) expresses, as an absolute value, the difference in height of each point compared to the arithmetical mean of the surface, the Sa parameter is characterized by a standard deviation of 0.1 μm;

Sz (maximum height) is defined as the sum of the largest peak height value and the largest pit depth value within the defined area, the Sz parameter is characterized by a standard deviation of 0.6 μm;

Rsm (spacing value, sometimes also called Sm) is the average distance between two successive passages of the profile through the "mean line"; and this gives the average distance between the "peaks" and therefore the average value of the widths of the patterns, the Rsm parameter is characterized by a standard deviation of 1.0 μm.

The water contact angle is the angle made between the tangent to a water drop and the surface of the support. The measure is made following the standard method ASTM C 813-75 (1989)

Preferably, the glass used for the invention is a clear glass or an extra clear glass. The clear glass has a composition characterized by an iron content expressed in weight percent of $Fe_2O_3$ which is at most 0.1%. This value drops to at most 0.015% for the extra clear glass. The glass substrate of the invention has a thickness that is greater than 1 mm, preferably greater than 1.5 mm and more preferably greater than 2 mm. The thickness of the glass substrate is at most 20 mm, preferably at most 15 mm and more preferably at most 10 mm. Advantageously the thickness of the glass substrate is comprised between 3 and 6 mm. A 4 mm glass substrate with the extra clear composition has a light transmission of about 91.7%. Air-side or tin-side referred to the surface of the glass being in contact with the tin bath or the face in air contact during the float process.

The low-e stack with the transparent conductive oxide is deposited on the air-side of the glass surface during the float manufacturing process. This is a very known process and more particularly the process is performed as it is described in EP1877350B1.

One surface of the glass can be textured through a mechanical or a chemical process, by methods well known from the man skilled in the art.

For example, texturing may be obtained by means of a controlled chemical attack with an aqueous solution based on hydrofluoric acid, carried out one or more times. Generally, the aqueous acidic solutions used for this purpose have a pH between 0 and 5 and they can comprise, in addition to the hydrofluoric acid itself, salts of this acid, other acids, such as HCl, $H_2SO_4$, $HNO_3$, $CH_3CO_2H$, $H_3PO_4$ and/or their salts (for example, $Na_2SO_4$, $K_2SO_4$, $(NH_4)_2SO_4$, $BaSO_4$, and the like), and also other adjuvants in minor proportions. Alkali metal and ammonium salts are generally preferred, such as, for example, sodium, potassium and ammonium bifluoride. The acid etching stage according to the invention can advantageously be carried out by controlled acid attack, for a time which can vary as a function of the acid solution used and of the expected result. Specific textured surface are achieved and are responsible for various level of Hortiscatter.

In all cases, the glazing is coated with a nano-porous silica layer on both glass surfaces.

The nano-porous silica layer may be deposited by any known mean. In a preferred embodiment the nano-porous silica layer is a $SiO_x$ nano-porous layer deposited as described in EP1679291B1 and in DE10159907A1, both incorporated here by reference. The nano-porous $SiO_x$ film will get its final optical and mechanical properties in a two-step production. At first, in the as-deposited state the thin film is coated by a PECVD process and results in high carbon content $SiO_xC_y$ coating, the layer comprises 5 to 30 at. % of Silicon, 20 to 60 at. % of Oxygen, 2 to 30 at. % of carbon and 2 to 30 at. % of hydrogen.

In order to get the final optical and mechanical properties one needs to bake the glass and the film. The carbon is desorbed during the tempering process leaving increased porosity, pores having a mean diameter greater than 5 nm. Increasing porosity results in a smaller refractive index, responsible for the antireflective performance. Preferably, after tempering the refractive index of the $SiO_x$ layer is at most 1.5, preferably at most 1.4 and more preferably at most 1.38. Temperatures for any heat strengthened glass are between 650° C.-680° C. During this tempering process the organic parts will desorb from the coating and leave a porous $SiO_2$ film. Advantageously, the final refractive index is 1.37.

Advantageously, the thickness of the heat treated nano-porous silica layer is at least 80 nm, preferably at least 90 nm and more preferably at least 100 nm. The thickness of the silicon oxide based layer is at most 180 nm, preferably at most 140 nm and more preferably at most 120. Advantageously, the film thickness after bake is around 110 nm (±5 nm).

Based on the special plasma process the surface of the glass together with the coating will be densified. The chemical bond between the Si group in the coating and the Si group on the surface of the glass at the interface of coating-glass surface is the main reason on the better mechanical durability performances at least on the tin side. Furthermore regarding the mechanical behaviour, the coating after bake is harder than the uncoated float glass for both sides.

The existence of the Hortiscatter is due to the presence of special microstructure implemented by texturing the glass surface while the nano-porosity of the anti-reflective coating is only improving the hemispherical light transmission. Moreover the nano-porous silica layer is also protecting the textured surface from corrosion by acting as diffusion barrier for volatile species inside the core glass, giving enhanced chemical and mechanical durability which enable the longer performance with the minimized deterioration rate, being in line with class A coating based on the norm EN 1096-2 (2012-E).

DESCRIPTION OF EMBODIMENTS/EXAMPLES

The following examples have been made in accordance with the invention.

Example 1. A first layer of $TiO_2$ with a thickness of 8.1 nm has been deposited on a ribbon of 4 mm thick extra-clear glass sheet by CVD. The precursor used was titanium tetraisopropoxide (TTIP) and the layer was deposited in the float tank where the glass has a temperature comprised between 660 and 700° C. A second layer of silicon oxide with a thickness of 27.4 nm was deposited on the first layer also by CVD. The precursors used are silane, oxygen and nitrogen as carrier gas. This second layer has been deposited in the float bath when the glass ribbon is at a temperature comprised between 640 and 660° C. A third layer of tin oxide doped with fluorine having a thickness of 320.6 nm was finally deposited above the $SiO_2$ layer. The precursor used was monobutyl-tin-trichloride (MBTC) combined with trifluoroacetic acid (TFA). The annealed glass sheet, after cooling and cutting process, was transferred to a coating line where a $SiO_xC$, layer was deposited by a PECVD method as described in EP1679291B1 on both glass sides. Basic coating material is an HMDSO which is heated up in an evaporator outside the line to transfer the chemical fluid from liquid to the gas phase in combination with an plasma in vacuum atmosphere comprising oxygen and forming an amorphous SiO, film with high organically content on the glass surface. Each SiO, layer was heat treated at a temperature between 650° C. and 680° C. during about 4 minutes. After bake the film thickness of the nano-porous silica layer deposited on the tin side of the glass was 118.9 nm and the film thickness of the nano-porous silica layer deposited above the CVD low-e stack, on the air side of the glass was 115.8 nm.

Example 2. The example 1 is repeated but after the CVD deposition and after the glazing has been cut, the resulted annealed coated glass has been washed with deionized water and then dried. An acid etching solution, composed by volume of 50% $NH_4HF_2$, 25% water, 6% concentrated $H_2SO_4$, 6% of a 50% by weight aqueous HF solution, 10% $K_2SO_4$ and 3% $(NH_4)_2SO_4$, at 20-25° C., was allowed to contact the glass surface for 1.5 minutes on the uncoated side. After removal of the acid solution, the glass surface was rinsed with water and washed again and the resulted textured glass sheet was then transferred to a coating line where a $SiO_xC$, layer was deposited by a PECVD method on both glass sides in the same way as in example 1. The PECVD coated glass is then sent to a tempering furnace where it is submitted at a temperature between 650° C. and 680° C. during about 4 minutes.

The performances of the coated glazing of the examples 1 and 2 have been measured after tempering of the coated glass. Results are given in the tables 4 and 5.

TABLE 4

Measurements on the coated glazing of the example 1 (without hortiscatter).

| | Glazing of the example without the nano-porous silica layers | Glazing of the example with the nano-porous silica layers |
|---|---|---|
| Normal emissivity (%) | 13 | 13 |
| $T_{hem}$ (%) | 75.45 | 86.6 |
| PAR transmission (%) | 82.6 | 92.6 |

TABLE 5

Measurements on the coated glazing of the example 2

| | | Glazing of the example with the nano-porous silica layers |
|---|---|---|
| Roughness parameters | Sa | 0.86 μm |
| | Sz | 6.2 μm |
| | Rsm | 80 μm |
| Normal emissivity | | 0.13 |
| $T_{hem}$ (%) | | 77.6 |
| PAR transmission (%) | | 82.3 |
| Water contact angle (°) | | <30 |
| Hortiscatter (%) | | 30 |

The durability of the glazing for both example 1 and example 2 has been evaluated through Class A coating testing following EN 1096-2 (Class A) and coating for both examples successfully fulfil the norm.

The invention claimed is:

1. A greenhouse glazing, comprising:
a glass substrate with a first surface comprising a first coating and a second surface comprising a second coating,
wherein,
the first surface is an air-side face of the glass substrate and the second surface is a tin-side face of the glass substrate, and the second surface is textured prior to a deposition of the second coating in such a way that a roughness parameter Rsm is at most 155 μm,
the first coating on the first surface comprises a nano-porous silica layer having a thickness between 80 and 150 nm and a transparent conductive oxide located between the nano-porous silica layer and the first surface of the glass substrate,
the second coating on the second surface comprises a nano-porous silica layer having a thickness between 80 and 180 nm, and
a roughness of the second surface is characterized by a parameter Sz being 2-12 μm.

2. The greenhouse glazing of claim 1, wherein a first dielectric layer is deposited on the first surface between the transparent conductive oxide and the first surface.

3. The greenhouse glazing of claim 2, wherein the first dielectric layer is a titanium oxide layer and has a thickness between 5 and 25 nm.

4. The greenhouse glazing of claim 1, wherein a first dielectric coating layer and a second dielectric coating layer are deposited between the first surface of the glass substrate and the transparent conductive oxide, and the first dielectric layer is deposited directly on the first surface.

5. The greenhouse glazing of claim 4, wherein the first dielectric layer is a titanium oxide layer and has a thickness between 5 and 25 nm, and the second dielectric layer is deposited over the first dielectric layer and has a thickness between 10 and 40 nm.

6. The greenhouse glazing of claim 1, wherein the transparent conductive oxide is a doped tin oxide, the doping agent being fluorine or antimony.

7. The greenhouse glazing of claim 1, wherein the transparent conductive oxide has a thickness between 150 and 500 nm.

8. The greenhouse glazing of claim 1, wherein a roughness of the second surface is characterized by a parameter Sa being at least 0.05 μm.

9. The greenhouse glazing of claim 1, wherein a roughness of the second surface is characterized by a parameter Sz being at least 1 μm.

10. The greenhouse glazing of claim 1, wherein a roughness of the second surface is characterized by the roughness parameter Rsm being 50 μm to 155 μm.

11. The greenhouse glazing of claim 1, wherein each of the nano-porous silica layers deposited on the first surface or the second surface of the glass substrate has a refractive index of at most 1.5.

12. The greenhouse glazing of claim 1, wherein an emissivity is smaller than 0.20.

13. The greenhouse glazing of claim 1, having a durability of a class A glazing conform to a norm EN1096-2 2012E.

14. The greenhouse glazing of claim 1, wherein each of the nano-porous silica layers deposited on the first surface or the second surface of the glass substrate has a thickness between 100 and 120 nm.

15. The greenhouse glazing of claim 4, wherein the first dielectric layer is a titanium oxide layer having a thickness between 8 and 15 nm, the second dielectric layer is deposited over the first dielectric layer, and the second dielectric layer is a silicon oxide layer having a thickness between 10 and 40 nm.

16. The greenhouse glazing of claim 1, wherein the transparent conductive oxide has a thickness between 170 and 360 nm.

17. The greenhouse glazing of claim 1, wherein a roughness of the second surface is characterized by a parameter Sa being 0.10-10 μm.

18. The greenhouse glazing of claim 1, wherein a roughness of the second surface is characterized by a roughness parameter Rsm being 55 μm to 140 μm.

19. The greenhouse glazing of claim 1, wherein an emissivity is smaller than 0.16.

20. A greenhouse glazing, comprising:

a glass substrate with a first surface comprising a first coating and a second surface comprising a second coating, wherein, the first surface is an air-side face of the glass substrate and the second surface is a tin-side face of the glass substrate, and the second surface is textured prior to a deposition of the second coating in such a way that a roughness parameter Rsm is at most 155 μm, the first coating on the first surface comprises a nano-porous silica layer having a thickness between 80 and 150 nm and a transparent conductive oxide located between the nano-porous silica layer and the first surface of the glass substrate, the second coating on the second surface comprises a nano-porous silica layer having a thickness between 80 and 180 nm, and a roughness of the second surface is characterized by a parameter Sa being 0.10-10 μm.

21. A greenhouse glazing, comprising:

a glass substrate with a first surface comprising a first coating and a second surface comprising a second coating, wherein, the first surface is an air-side face of the glass substrate and the second surface is a tin-side face of the glass substrate, and the second surface is textured prior to a deposition of the second coating in such a way that a roughness parameter Rsm is at most 155 μm, the first coating on the first surface comprises in the following order, starting from the first surface of the glass substrate, a titanium oxide layer and having a thickness between 5 and 25 nm, a transparent conductive oxide, and a nano-porous silica layer having a thickness between 80 and 150 nm, the nano-porous silica layer being in direct contact with the transparent conductive oxide layer, and the second coating on the second surface comprises a nano-porous silica layer having a thickness between 80 and 180 nm.

* * * * *